US012614779B2

(12) United States Patent
Timmerman et al.

(10) Patent No.: US 12,614,779 B2
(45) Date of Patent: Apr. 28, 2026

(54) SILICONE FREE THERMAL INTERFACE MATERIAL WITH REACTIVE DILUENT

(71) Applicant: Henkel AG & Co. KGaA, Duesseldorf (DE)

(72) Inventors: John Timmerman, Minneapolis, MN (US); Yuqiang Qian, Falcon Heights, MN (US)

(73) Assignee: Henkel AG & Co. KGaA, Duesseldorf (DE)

( * ) Notice: Subject to any disclaimer, the term of this patent is extended or adjusted under 35 U.S.C. 154(b) by 882 days.

(21) Appl. No.: 17/844,232

(22) Filed: Jun. 20, 2022

(65) Prior Publication Data

US 2022/0328902 A1 Oct. 13, 2022

Related U.S. Application Data

(63) Continuation of application No. PCT/US2020/065507, filed on Dec. 17, 2020.

(60) Provisional application No. 62/950,510, filed on Dec. 19, 2019.

(51) Int. Cl.

| | |
|---|---|
| ***H01M 10/6551*** | (2014.01) |
| ***C08G 59/40*** | (2006.01) |
| ***C08G 65/333*** | (2006.01) |
| ***C08G 65/336*** | (2006.01) |
| ***C08K 3/22*** | (2006.01) |
| ***C09K 5/14*** | (2006.01) |
| ***H01M 10/613*** | (2014.01) |
| ***H01M 10/653*** | (2014.01) |

(52) U.S. Cl.

CPC .... *H01M 10/6551* (2015.04); *C08G 59/4085* (2013.01); *C08G 65/33303* (2013.01); *C08G 65/336* (2013.01); *C08K 3/22* (2013.01); *C09K 5/14* (2013.01); *H01M 10/613* (2015.04); *H01M 10/653* (2015.04); *C08K 2003/2227* (2013.01); *C08K 2201/001* (2013.01)

(58) Field of Classification Search

None

See application file for complete search history.

(56) References Cited

U.S. PATENT DOCUMENTS

| | | | |
|---|---|---|---|
| 3,632,557 | A | 1/1972 | George et al. |
| 6,737,482 | B1 | 5/2004 | Ando et al. |
| 6,888,257 | B2 | 5/2005 | Wilson et al. |
| 11,041,103 | B2 | 6/2021 | Zhang et al. |

(Continued)

FOREIGN PATENT DOCUMENTS

| | | |
|---|---|---|
| KR | 1020190021182 | 3/2019 |
| WO | 2021117476 A1 | 6/2021 |

OTHER PUBLICATIONS

Sigma Aldrich DER 332 (Year: 2025).*

(Continued)

*Primary Examiner* — Randy P Gulakowski
*Assistant Examiner* — Holley Grace Hester
(74) *Attorney, Agent, or Firm* — Steven C. Bauman

(57) ABSTRACT

A silicone-free thermal interface for placement along a thermal dissipation pathway is provided for long-term durability. The thermal interface is formed from a multi-part composition and cured in place to obtain a conformable coating with low durometer hardness, which is maintained by a non-crosslinked diluent product formed from a reactive diluent system.

11 Claims, 1 Drawing Sheet

(56) References Cited

U.S. PATENT DOCUMENTS

| | | | | |
|---|---|---|---|---|
| 2004/0127631 | A1 | 7/2004 | Kanamori et al. | |
| 2007/0230131 | A1 | 10/2007 | Bunyan et al. | |
| 2008/0039555 | A1 | 2/2008 | Ruyters et al. | |
| 2008/0039560 | A1 | 2/2008 | Mills et al. | |
| 2013/0042972 | A1 | 2/2013 | Timmerman et al. | |
| 2015/0299457 | A1* | 10/2015 | Fu | H05K 7/2039 428/35.8 |
| 2016/0009975 | A1* | 1/2016 | Timmerman | C08K 3/042 252/75 |
| 2016/0130402 | A1* | 5/2016 | Schubert | C08G 65/336 524/425 |
| 2016/0315030 | A1 | 10/2016 | Strader et al. | |
| 2017/0292050 | A1* | 10/2017 | Burckhardt | C08K 5/548 |
| 2018/0076493 | A1* | 3/2018 | Park | H01M 50/227 |
| 2018/0305596 | A1* | 10/2018 | Schubert | C09J 171/02 |
| 2019/0078007 | A1 | 3/2019 | Zhang et al. | |
| 2019/0097285 | A1* | 3/2019 | Phlegm | C09K 5/06 |
| 2019/0225795 | A1* | 7/2019 | Yano | C08G 65/336 |
| 2020/0197888 | A1 | 6/2020 | Cho et al. | |
| 2020/0208618 | A1 | 7/2020 | Cho et al. | |
| 2023/0002609 | A1 | 1/2023 | Hisanaga | |

OTHER PUBLICATIONS

Univar Solutions DER 332 (Year: 2025).*
International Search Report issued in connection with International Application No. PCT/US2020/065507 mailed Apr. 16, 2021.

* cited by examiner

SILICONE FREE THERMAL INTERFACE MATERIAL WITH REACTIVE DILUENT

FIELD OF THE INVENTION

This invention relates to thermal interface materials generally, and more particularly to a silicone-free two-component liquid dispensable system that is curable in situ into a thermally conductive coating that contains physical flexibility over an extended time period.

BACKGROUND OF THE INVENTION

Thermally conductive materials are widely employed as interfaces between, for example, a heat-generating electronic component and a heat dissipater for permitting transfer of excess thermal energy from the electronic component to a thermally coupled heat dissipater. Numerous designs and materials for such thermal interfaces have been implemented, with the highest performance being achieved when gaps between the thermal interface and the respective heat transfer surfaces are substantially avoided to promote conductive heat transfer from the electronic component to the heat dissipater. The thermal interface materials therefore preferably mechanically conform to the somewhat uneven heat transfer surfaces of the respective components. An important physical characteristic of high performance thermal interface materials is therefore flexibility and a relatively low hardness.

Some example conformable thermal interface materials include silicone polymers forming a matrix that is filled with thermally conductive particles such as aluminum oxide and boron nitride. The materials are typically sufficiently flexible to conform to irregularities of the interface surfaces, whether at room temperature and/or elevated temperatures. However, silicone-based materials may be incompatible in certain applications, such as where outgassing of silicone-based materials may not be tolerated. Alternative non-silicone polymer systems have drawbacks that limit their adoption in thermal interface applications. Some conventional non-silicone systems that exhibit acceptable hardness values also exhibit relatively high pre-cure viscosities that present challenges for dispensing and assembling. Other non-silicone systems may have suitable pre-cure viscosities for dispensation and assembly as well as acceptable post-cure hardness, but typically require either a reactive diluent that can interfere with the polymer cross-linking reaction, or non-reactive diluents that tend to migrate out of the thermal interface material which causes an increase to the hardness and brittleness of the thermal interface material over time.

Diluents, in general, are substances used as a diluting agent. For the purposes of the present invention, diluents are materials that act as viscosity and hardness modifies and particularly as viscosity and hardness reducers. As indicated above, many non-silicone polymer systems useful in thermally conductive interfaces exhibit pre-cured viscosities that are too high to be easily dispensable through standard liquid dispensation systems. Inclusion of one or more diluents in the pre-cured polymer system can aid in reducing viscosity to a point at which delivery through conventional liquid dispensing equipment is possible. The presence of diluents in the cross-linked polymer network may also beneficially reduce cured hardness parameters to obtain desired flexibility.

Conventional use of diluents to reduce the viscosity and hardness of thermally conductive cross-linked networks have suffered from migration of the diluents out from the network after cross-linking. This migration can result in problems for nearby components and also causes changes in the mechanical, electrical, and thermal properties of the interface material. These issues are magnified in thermally conductive materials due to the high proportion of particulate filler in the polymer matrix.

It is therefore an object of the present invention to provide a silicone-free thermal interface that is formed from a relatively low viscosity liquid dispensable composition, and which cures to a durometer hardness that is relatively stable over time. The composition may preferably include a two-component reactive diluent system that reacts to increase in molecular weight, but does not appreciably react with the cross-linkable polymer system.

It is another object of the present invention to provide a silicone-free thermal interface that is formed from a two-part reactant composition deliverable through liquid dispensation equipment, and curable to a relatively low durometer hardness body that does not substantially change in durometer hardness over an extended period of time.

It is another object of the present invention to provide a two-part reactive diluent that is compatible with a silicone-free polymer matrix and reacts with itself to increase in molecular weight without participating in the polymer cure.

SUMMARY OF THE INVENTION

By means of the present invention, a low hardness, high thermal conductivity silicone-free thermal interface may be formed from a composition exhibiting a viscosity suitable for dispensation as a liquid coating through conventional liquid dispensing equipment. The thermal interface of the present invention preferably exhibits a relatively stable post-cure durometer hardness over an extended period of time. The relatively low durometer hardness facilitates good physical conformability of the thermal interface to the coated substrate. In some embodiments, the coated substrate may include one or more batteries from a battery system.

The composition generally includes three primary components: a non-silicone cross-linkable polymer, a thermally conductive particulate filler, and a reactive diluent. The pre-cured material exhibits a liquid dispensable viscosity, and is curable to form a soft solid with high thermal conductivity. The reactive diluent permits the material to be dispensable and maintain a low viscosity, but is reactive to increase in molecular weight to restrict its mobility out from the cured material.

In one embodiment, a thermal interface is formed from a two-part composition including a first component having a first reactant with a reactive functionality of one or two, with the first component exhibiting a viscosity of less than 500,000 cP at 1 $s^{-1}$ shear rate at 20° C. The composition further includes a second component having a second reactant with a reactive functionality of:

(i) one or two if the first reactant functionality is one or two; and (ii) three or more only if the first reactant functionality is one.

The second component of the composition preferably exhibits a viscosity of less than 500,000 cP at 1 $s^{-1}$ shear rate at 20° C. The composition also includes a non-silicone cross-linkable polymer and thermally conductive filler. The first and second reactants may be reactable with one another to form a product having a viscosity of at least 1,000,000 cP at 1 $s^{-1}$ shear rate at 20° C., and wherein the thermal interface exhibits a thermal conductivity of at least 1 W/m*K.

In some embodiments, each of the polymer and thermally conductive filler are included in one or more of the first and second components. The first and second reactants of the first and second components may be selected from reactive sets from epoxies, amines, acrylates, thiols, polyols, and isocyanates. The composition maybe curable to a hardness of less than 80 Shore 00, and more preferably between 20-70 Shore 00.

A method for forming a thermal interface on a surface includes providing a first component with a first reactive diluent having a viscosity of less than 100 cP, a second component with a second reactive diluent having a viscosity of less than 100 cP, wherein the first and second diluents are reactive with one another to form a non-crosslinked product with a viscosity of greater than 1000 centipoise. The method includes further providing a non-silicone curable resin and a thermally conductive filler. The first and second components, as well as the resin and the filler, may be dispensed through at least one orifice onto the surface to cause the first diluent to react with the second diluent. The method further includes curing the resin, preferably to a hardness of less than 80 Shore 00. The thermal interface may preferably exhibit the thermal conductivity of at least 1.0 W/m*K. Each of the resin and thermally conductive filler may be included in one or more of the first and second components. The first component may be dispensed as a first liquid through a first orifice, and the second component may be dispensed as a second liquid through a second orifice.

The surface may be connected to or a portion of a battery, such that a battery system includes a battery and the thermal interface thermally coupled to the battery.

DETAILED DESCRIPTION OF PREFERRED EMBODIMENTS

Figure 1:
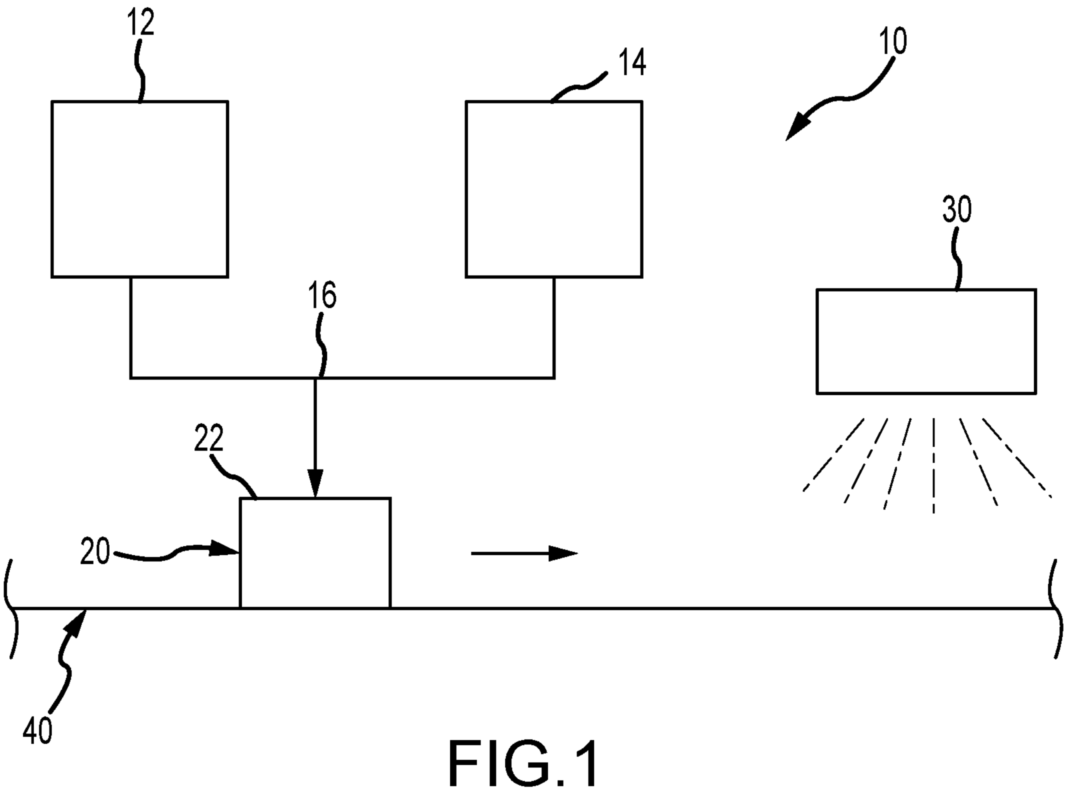
FIG. 1 is a schematic illustration of a system for forming a thermal interface on a surface.

The objects and advantages enumerated above together with other objects, features, and advances represented by the present invention will now be presented in terms of detailed embodiments described with reference to the attached drawing figures. Other embodiments and aspects of the invention are recognized as being within the grasp of those having ordinary skill in the art.

The thermally conductive interface of the present invention may be formed as a coating on a surface or a self-supporting body for placement along a thermal dissipation pathway, typically to remove excess heat from a heat-generating electronic component. The thermal interface is preferably silicone-free and filled with thermally conductive particles to achieve a desired thermal conductivity, typically at least about 1 W/m*K. The thermal interface is preferably conformable to surface roughness by exhibiting a durometer hardness of less than about 80 Shore 00.

Generally, the thermally conductive interface is a curable material formed from a composition of a first component having a first reactant, a second component having a second reactant that is reactable with the first reactant, a non-silicone cross-linkable polymer, and a thermally conductive particulate filler. The first and second reactants are preferably diluents which themselves have a relatively low viscosity and are provided to reduce the viscosity of the overall pre-cured composition so that the composition is readably dispensable through liquid dispensing equipment. The first and second reactive diluents may therefore each exhibit a viscosity of less than 500 cP. In another embodiment, each of the first and second reactive diluents may exhibit a viscosity of less than 100 cP. In an example embodiment, each of the first and second reactive diluents exhibit a viscosity of approximately 20 cP. The quantitative viscosity values described herein are considered to be taken at room temperature (20° C.) and a shear rate of 1 $s^{-1}$ on a parallel-plate rheometer.

The first and second diluents are preferably reactive with one another to form a non-crosslinked product with a viscosity of more than 1000 cP. In some embodiments, the first and second diluent reactants are reactable with one another to form a product having a viscosity of at least 10,000 cP. By being reactable with one another, the first and second reactive diluents may react to form a diluent product with an increased molecular weight that is less likely to migrate out from the thermal interface than conventional diluent materials. As a result, the diluent product formed from the reaction of the first and second reactive diluents may continue to act as a hardness modifier to the thermal interface over an extended period of time. Such increase in molecular weight, however, occurs only upon reaction between the first and second reactive diluents, which may take place upon mixing of the first and second components of the thermal interface-forming composition subsequent to liquid dispensation.

An aspect of the present invention is that the reactive diluents do not participate in the polymer cross-linking reaction. Moreover, the diluent reaction itself does not cross-link, whereby the molecular weight of the diluent product is limited to an extent at which the diluent product retains a hardness reducing property to the overall thermal interface. Accordingly, the first and second reactive diluents are selected to be reactive with one another, but not undergo a cross-linking reaction. The first and second reactive diluents may therefore be selected to form only a non-crosslinked product. For the purpose hereof, the term "non-crosslinked" means that no reactant molecule is linked to more than two other reactant molecules unless the other reactant molecules are linked only to a single reactant molecule. Example non-crosslinked diluent products are as follows:

y—x—y (1)

—(x—y—x—y—x)— (2)

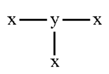

(3)

wherein:

x=first reactive diluent y=second reactive diluent

In order to control the reactivity of the first and second reactive diluents, the "functionality" of the reactive diluent should be considered. The term functionality refers to the number of polymerizable groups in the reactant, which affects the formation and degree of cross-linking of polymers. A monofunctional molecule possesses a functionality (f)=1, a difunctional molecule possesses a functionality (f)=2, and a trifunctional possesses a functionality (f)=3. In the case of a functionality (f=2), a linear reaction product may be formed. Reactants with a functionality (f≥3) can lead to a branching point and cross-linked products. Monofunctional reactants (f=1) lead to a chain termination. The following are example diluent reaction products of diluent reactants with noted functionality:

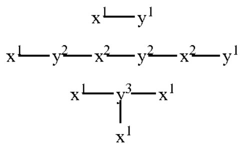

wherein:

x=first reactive diluent y=second reactive diluent $x^1$ is f=1

$x^2$ is f=2

$x^3$ is f=3

In some embodiments, the first reactant has a reactive functionality of 1 or 2, and the second reactant has a reactive functionality of (i) 1 or 2 if the first reactant functionality is 1 or 2; and (ii) 3 or more only if the first reactant functionality is 1.

With such functionality limitations, the first and second reactants are reactive to only form a non-crosslinked product. By preventing a cross-linking of the first and second reactants, the diluent reaction product, albeit with larger molecular weight, is able to soften the thermal interface material.

The first and second reactive diluents may be added to the composition in an amount suitable to appropriately adjust viscosity for pre-cured dispensability, and post-cured softness. In some embodiments, the reactive diluents may represent between about 5-50 percent by weight of the composition. Example reactive diluent systems representing the first and second reactive diluents include epoxies/amines, amines/acrylates, acrylates/acrylates plus catalysts, thiols/acrylates, polyols/isocyanates, and amines/isocyanates. It is contemplated that those of ordinary skill in the art may select reactive sets of appropriate diluents from one or more of epoxies, amines, acrylates, thiols, polyols, and isocyanates.

The composition for forming the thermal interface of the present invention preferably includes a non-silicone curable resin, which forms the bulk matrix of the thermal interface. In some embodiments, the composition may include a non-silicone cross-linkable polymer. In preferred embodiments, the thermal interface is silicone-free, wherein no more than trace amounts of silicone are contained in the thermal interface. It is contemplated that a wide variety of non-silicone cross-linkable polymers may be used in the compositions of the present invention to achieve desired physical characteristics. Example cross-linking polymer systems include silyl-modified polymers (SMP), epoxies/amines, epoxies/anhydrides, acrylates, and polyurethanes. Preferably, the cross-linking polymer is any non-silicone polymer that forms a cross-linked network without reacting with the diluents. The applicant has found that SMP materials, such as those described in U.S. Pat. No. 3,632,557 and U.S. Patent Application Publication No. 2004/0127631, the contents of which being incorporated herein their entireties, may be particularly useful in the preparation of thermally conductive interfaces of the present invention. It is to be understood that various combinations of cross-linking polymer and reactive diluent systems may be selected for particular properties. Example combinations of cross-linking polymers and reactive diluents is set forth in the following Table 1:

TABLE 1

| Cross-Linkable Polymer | Reactive Diluent System |
|---|---|
| Silyl-modified polymers (SMP) | Epoxy/amine |
| Silyl-modified polymers (SMP) | Amine/acrylate |
| Silyl-modified polymers (SMP) | Acrylate |
| Silyl-modified polymers (SMP) | Thiol/acrylate |
| Epoxy/anhydride | Acrylate |
| Epoxy/anhydride | Polyol/isocyanate |

Systems using epoxy/amine, acrylate, polyurethane, or thiol/ene polymer cross-linking systems could potentially co-react with some of the diluents listed in Table 1 above, but specific combinations of molecules with appropriate catalysts and/or inhibitors may be possible.

In order to enhance the thermal conductivity of the thermally conductive interface, the compositions of the present invention may include thermally conductive particles dispersed therein. The particles may be both thermally conductive and electrically conductive. Alternative, the particles may be thermally conductive and electrically insulating. Example thermally conductive particles include aluminum oxide, silicone oxide, aluminum trihydrate, zinc oxide, graphite, magnesium oxide, aluminum nitride, boron nitride, metal particulate, and combinations thereof. The thermally conductive particles may be of various shape and size, and it is contemplated that a particle size distribution may be employed to fit the parameters of any particular application. In some embodiments, the thermally conductive particles may have an average particle size of between about 0.1-100 micrometers, and may be present in the thermally conductive material at a concentration by weight of between about 20-95 percent.

The thermally conductive particles may be dispersed in at least one of the first and second components at a loading concentration of between about 20-95 percent by weight. It is desirable that sufficient thermally conductive particles are provided so that the thermally conductive interface formed from the component mixture exhibits a thermal conductivity of at least 1 W/m*K. In some embodiments, each of the cross-linkable polymer and the thermally conductive filler may be included in one or more of the first and second components.

The compositions for forming the thermal interface of the present invention are preferably selected to be curable to a hardness of less than 80 Shore 00, and more preferably to a hardness between 20-70 Shore 00. Such durometer hardness of the cured thermal interface is driven by a combination of the selected reactive diluents, the non-silicone cross-linkable polymer, and the thermally conductive filler, as well as the reactive concentrations of each component.

Various additional components may be included in the compositions of the present invention to achieve desired reaction rates and physical properties of the reactants and final thermal interface. Example additives include cross-linking catalysts, non-reactive diluents, solvents, anti-oxidants, surfactants, reaction accelerators, reaction inhibitors, stabilizers, fillers, and combinations thereof.

Figure 2:
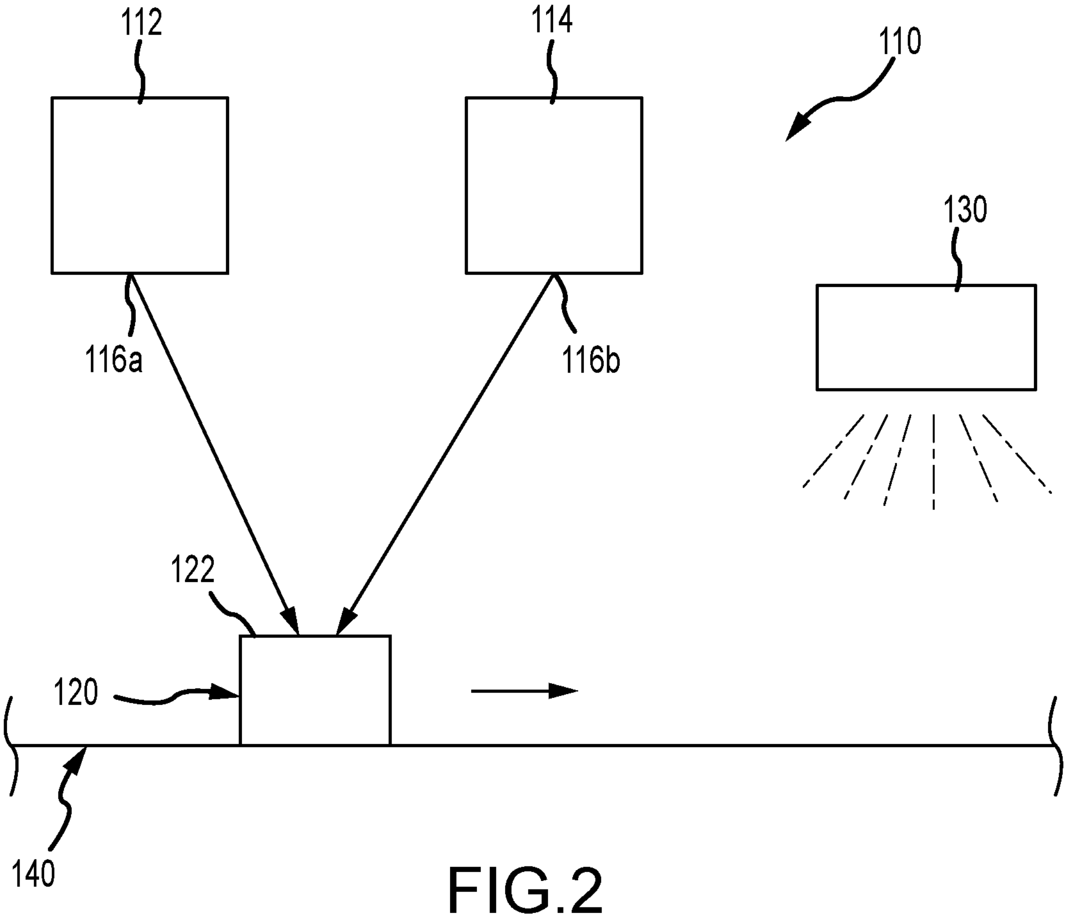
FIG. 2 is a schematic illustration of a system for forming a thermal interface on a surface.

A system and method for forming a thermal interface of the present invention on a surface is schematically illustrated in FIGS. 1 and 2. Systems 10, 110 include a supply of a first component 12, 112 having a first reactive diluent, and a supply of a second component 14, 114 having a second reactive diluent that is reactive with the first reactive diluent. In the illustrated embodiments, a non-silicone curable resin and a thermally conductive filler is provided in one or more of the first and second components supplies 12, 112 and 14, 114. The first and second components are dispensed through at least one orifice onto a surface 22, 122 to cause the first reactive diluent to react with the second reactive diluent. In system 10 illustrated in FIG. 1, the first and second components are dispensed through a common orifice 16. In system 110 illustrated in FIG. 2, first and second components are dispensed through separate orifices 116A, 116B. Surface 22 may be a surface of or thermally coupled to a battery 20. Following dispensation of the first and second components onto surface 22, 122, the coating may be cured by a curing means 30, 130. Example curing means may include a heating oven, an ultra-violet (UV) radiation lamp, a photo initiator, or the like. In some embodiments, the curable resin maybe cured at temperatures exceeding 25° C. The schematic illustrations of FIGS. 1 and 2 illustrate a conveyor 40, 140 for moving the coated battery 20, 120 into a curing station exposed to the curing means 30, 130. In preferred embodiments, the first and second components may be dispensed through at least one orifice 16, 116 in liquid form.

EXAMPLES

A first example thermal interface was formed from the following two-component composition:

| First Component | | Second Component | |
|---|---|---|---|
| Material | Concentration (PHR) | Material | Concentration (PHR) |
| Monoamine terminated polyether | 100 | Dimethoxy silane terminated polyethers | 40 |
| Alumina | 1050 | | |
| | | O-cresyl glycidyl ether (monoepoxide) | 60 |
| | | Alumina | 1050 |

The first component exhibited a viscosity of 100,000 cP and the second component exhibited a viscosity of 200,000 cP as measured on a parallel plate rheometer at a shear rate of 1 $s^{-1}$.

Upon mixing of the first and second components, a cured solid with a durometer hardness of 50 Shore 00 and a thermal conductivity of 3.0 W/m*K was produced after 24 hours at 25° C.

A second example thermal interface was prepared with the following composition:

| Part A | | Part B | |
|---|---|---|---|
| Material | Concentration (PHR) | Material | Concentration (PHR) |
| Plasticizer | 50-75 | Monoamine diluent | 40-60 |
| Epoxy resin | 25-35 | SMP cross-linking resin | 40-55 |
| Alumina | 600-1000 | Alumina | 600-1000 |

Upon mixing the first and second components, a cured solid with a hardness of 55 Shore 00 was obtained.

The invention has been described herein in considerable detail in order to comply with the patent statutes, and to provide those skilled in the art with the information needed to apply the novel principles and to construct and use embodiments of the invention as required. However, it is to be understood that various modifications can be accomplished without departing from the scope of the invention itself.

The invention claimed is:

1. A thermal interface formed from a two-part composition comprising:

a first component having a first reactant with a reactive functionality of one or two, the first component exhibiting a viscosity of less than 500,000 cP at 1 s-1 and 20° C.

a second component having a second reactant that is reactable with the first reactant without cross-linking, the second reactant having with a reactive functionality of:

(i) one or two if the first reactant functionality is one or two; and (ii) three or more only if the first reactant functionality is one, wherein the second component exhibits a viscosity of less than 500 Pas at 1 $s^{-1}$; a non-silicone cross-linkable silyl-modified polymer resin; and thermally conductive filler, wherein the first and second reactants do not participate in a cross-linking reaction of the non-silicone silyl-modified polymer resin, but are reactable with one another to form a product having a viscosity of at least 1000 Pas at 1 $s^{-1}$ at 20° C., and wherein the thermal interface exhibits a thermally conductivity of at least 1 W/m*K.

2. The thermal interface as in claim 1 wherein each of the polymer and the thermally conductive filler are included in one or more of the first and second components.

3. The thermal interface as in claim 2 wherein the composition is curable to a hardness of less than 80 Shore 00.

4. The thermal interface as in claim 3 wherein the composition is curable to a hardness of between 20-70 Shore 00.

5. The thermal interface as in claim 1 wherein the polymer cures at temperatures exceeding 25° C.

6. The thermal interface as in claim 1 wherein the non-silicone silyl-modified polymer resin includes a silyl-modified polyether, the first reactant comprises an epoxy resin, and the second reactant comprises an amine resin.

7. The thermal interface as in claim 1 wherein the thermally conductive filler is selected from the group consisting of aluminum oxide, aluminum nitride, silicon oxide, zinc oxide, and boron nitride.

8. The thermal interface as in claim 1 wherein the first and second reactants are selected from reactive sets from the group consisting of epoxies, amines, acrylates, thiols, polyols, and isocyanates.

9. The thermal interface as in claim 1 being silicone free.

10. A battery system, comprising;

a battery; and the thermal interface of claim 1 thermally coupled to said battery.

11. The battery system as in claim 10 wherein the thermal interface is coated on said battery.

* * * * *